US011882898B2

(12) United States Patent
Mason et al.

(10) Patent No.: US 11,882,898 B2
(45) Date of Patent: Jan. 30, 2024

(54) SOLE, PARTICULARLY FOR SHOES

(71) Applicant: DIADORA SPORT S.R.L., Caerano di San Marco (IT)

(72) Inventors: Angelo Mason, Caerano di San Marco (IT); Enrico Polegato Moretti, Crocetta del Montello (IT)

(73) Assignee: DIADORA SPORT S.R.L., Caerano di San Marco (IT)

( * ) Notice: Subject to any disclaimer, the term of this patent is extended or adjusted under 35 U.S.C. 154(b) by 168 days.

(21) Appl. No.: 15/778,921

(22) PCT Filed: Nov. 23, 2016

(86) PCT No.: PCT/EP2016/078567
§ 371 (c)(1),
(2) Date: May 24, 2018

(87) PCT Pub. No.: WO2017/089406
PCT Pub. Date: Jun. 1, 2017

(65) Prior Publication Data
US 2018/0368516 A1    Dec. 27, 2018

(30) Foreign Application Priority Data

Nov. 24, 2015    (IT) .................. 102015000075726

(51) Int. Cl.
*A43B 13/12*    (2006.01)
*A43B 13/18*    (2006.01)
(Continued)

(52) U.S. Cl.
CPC .............. *A43B 13/125* (2013.01); *A43B 5/00* (2013.01); *A43B 7/141* (2013.01); *A43B 7/1475* (2013.01);
(Continued)

(58) Field of Classification Search
CPC ..... A43B 13/125; A43B 13/04; A43B 13/127; A43B 13/185; A43B 13/38; A43B 13/18;
(Continued)

(56) References Cited

U.S. PATENT DOCUMENTS

| 1,898,033 | A | * | 2/1933 | Cohn | ................... | A43B 13/187 |
| | | | | | | 12/142 R |
| 4,223,455 | A | * | 9/1980 | Vermeulen | ............. | A43B 13/20 |
| | | | | | | 36/29 |

(Continued)

FOREIGN PATENT DOCUMENTS

| CN | 1053884 A | 8/1991 |
| CN | 2901952 Y | 5/2007 |

(Continued)

OTHER PUBLICATIONS

International Search Report dated Dec. 13, 2016 re: Application No. PCT/EP2016/078567, pp. 1-3, citing: US 2009/241373 A1, GB 2 471 459 A, US 2014/331517 A1 and WO 2009/106076 A1.

(Continued)

*Primary Examiner* — Timothy K Trieu
*Assistant Examiner* — Dakota Marin
(74) *Attorney, Agent, or Firm* — CANTOR COLBURN LLP (57) ABSTRACT

A plantar shaped shoe sole constituted by layers includes a mid-sole constituted by a body and elastically compressible protrusions protruding downward from a body lower surface, each having an axial cavity and first holes. An upper surface of the body has holes associated with first holes of each protrusion. First protrusions are arranged at a central area of the heel and forefoot of the body and have a greater protruding height than second protrusions. First and second protrusions have first and second apices, respectively, forming anatomically-contoured curved surfaces, formed at pro- (Continued)

trusion free ends, opposite the body lower surface. Each axial cavity extends from the upper surface to their respective apex. There are more forefoot region first holes of first protrusions than second protrusions. The sole includes a tread and an elastic plantar supporting structure, at least one seat on the upper surface wherein the apices are positioned on the seat.

15 Claims, 12 Drawing Sheets

(51) Int. Cl.
    *A43B 5/00*         (2022.01)
    *A43B 7/1405*     (2022.01)
    *A43B 7/1475*     (2022.01)
    *A43B 13/04*      (2006.01)
    *B32B 3/26*       (2006.01)
    *A43B 13/38*      (2006.01)
    *A43B 7/32*       (2006.01)

(52) U.S. Cl.
    CPC ............ *A43B 13/04* (2013.01); *A43B 13/127* (2013.01); *A43B 13/185* (2013.01); *B32B 3/266* (2013.01); *A43B 7/32* (2013.01); *A43B 13/18* (2013.01); *A43B 13/181* (2013.01); *A43B 13/38* (2013.01); *B32B 2437/02* (2013.01)

(58) Field of Classification Search
    CPC ......... A43B 13/181; A43B 5/00; A43B 7/141; A43B 7/1475; A43B 7/32; B32B 3/266; B32B 2437/02
    USPC ........................................................ 36/28, 44
    See application file for complete search history.

(56) References Cited

U.S. PATENT DOCUMENTS

| | | | | |
|---|---|---|---|---|
| 4,267,648 A * | 5/1981 | Weisz | .................... | A43B 21/30 36/28 |
| 4,326,345 A * | 4/1982 | Sbicca | ................... | B29D 35/10 36/135 |
| 4,521,979 A * | 6/1985 | Blaser | .................. | A43B 13/184 36/28 |
| 4,733,483 A * | 3/1988 | Lin | ......................... | A43B 17/02 36/28 |
| 4,843,741 A * | 7/1989 | Yung-Mao | ............ | A43B 1/0072 36/114 |
| 5,233,767 A * | 8/1993 | Kramer | .................. | A43B 7/081 36/28 |
| 5,367,791 A * | 11/1994 | Gross | ..................... | A43B 13/26 36/31 |
| 5,619,809 A * | 4/1997 | Sessa | ..................... | A43B 13/185 36/3 R |
| 6,434,859 B1 * | 8/2002 | Kim | ........................ | A43B 7/142 36/43 |
| 6,709,411 B1 * | 3/2004 | Olinger | ................. | A61F 5/3746 602/19 |
| 6,754,982 B2 * | 6/2004 | Reed | ..................... | A43B 7/1425 36/29 |
| 7,383,648 B1 * | 6/2008 | Litchfield | ............ | A43B 13/203 36/29 |
| 7,426,792 B2 * | 9/2008 | Swigart | ................ | A43B 3/0031 36/28 |
| 7,712,229 B2 * | 5/2010 | Yang | .................... | A43B 1/0045 36/29 |
| 7,871,388 B2 * | 1/2011 | Brown | ................... | A61F 5/026 602/19 |
| 8,914,998 B2 * | 12/2014 | Gheorghian | ............. | A43B 5/06 36/103 |
| 10,588,379 B2 * | 3/2020 | Sussmann | ............ | A43B 3/0047 |
| 2003/0140524 A1 * | 7/2003 | Robinson, Jr. | ....... | A43B 7/1425 36/44 |
| 2004/0016148 A1 * | 1/2004 | Chen | ..................... | A43B 17/06 36/3 R |
| 2008/0250673 A1 * | 10/2008 | Andrews | .............. | A43B 13/186 36/25 R |
| 2009/0241373 A1 | 10/2009 | Kita et al. | | |
| 2009/0282704 A1 * | 11/2009 | Park | ....................... | A43B 7/146 36/29 |
| 2009/0293311 A1 | 12/2009 | Sun | | |
| 2011/0232128 A1 * | 9/2011 | Propet | .................. | A43B 13/181 36/28 |
| 2012/0192451 A1 * | 8/2012 | Fujikura | ................ | A43B 13/14 36/44 |
| 2013/0019499 A1 * | 1/2013 | Hsu | ....................... | A43B 17/023 36/44 |
| 2013/0219746 A1 * | 8/2013 | Chiu | ....................... | A43B 17/03 36/44 |
| 2014/0130269 A1 * | 5/2014 | Dabah | .................. | A43B 13/181 12/142 R |
| 2014/0259742 A1 * | 9/2014 | Wu | ....................... | A43B 13/187 36/28 |
| 2014/0259744 A1 * | 9/2014 | Cooper | ................ | A43B 13/122 36/28 |
| 2014/0331517 A1 | 11/2014 | Seo | | |
| 2017/0071289 A1 * | 3/2017 | Auyang | ............... | A43B 13/127 |
| 2019/0328082 A1 * | 10/2019 | Del Biondi | ............ | A43B 13/14 |

FOREIGN PATENT DOCUMENTS

| | | |
|---|---|---|
| CN | 201042234 Y | 4/2008 |
| CN | 201274808 Y | 7/2009 |
| CN | 201813958 U | 5/2011 |
| CN | 202890707 U | 4/2013 |
| EP | 1955607 A1 | 8/2008 |
| GB | 2471459 A | 1/2011 |
| JP | H0217003 A | 1/1990 |
| JP | H05503451 A | 6/1993 |
| JP | H11151101 A | 6/1999 |
| JP | 2000023706 A | 1/2000 |
| JP | 2009537185 A | 10/2009 |
| WO | 9111928 A1 | 8/1991 |
| WO | 2009106076 A1 | 9/2009 |
| WO | 2009136685 A1 | 11/2009 |
| WO | 2015097015 A1 | 7/2015 |

OTHER PUBLICATIONS

Written Opinion dated Dec. 13, 2016 re: Application No. PCT/EP2016/078567, pp. 1-4, citing: US 2009/241373 A1.
KR Office Action dated Oct. 6, 2020 re: Application No. 2018-545691, p. 13, citing: JP H05-503451 A, WO 2015/097015 A1, JP H11-0151101 A, U.S. Pat. No. 04,521,979 A, WO 2009/136685 A1, JP 2009-537185 A, WO 91/11928 A1, US 2009/0293311 A1, JP H02-017003 A and JP 2000-023706 A.
EP Examination Report dated Apr. 6, 2022 re: Application No. 16 798 795.7-1015, pp. 1-6, citing: US 2013/0219746 A1 and EP 1 955 607 A1.
Chinese Office Action for Chinese Application No. 2016800686422, dated Aug. 30, 2023, 8 pages with translation.

* cited by examiner

SOLE, PARTICULARLY FOR SHOES

TECHNICAL FIELD

The present disclosure relates to a sole, particularly for shoes, such as for example sports shoes for running, tennis and football, and leisure shoes.

BACKGROUND

Nowadays it is known to provide a sole for shoes that usually has a contained thickness and is made with elastically flexible material both in order to conform anatomically to the foot as a function of the configurations it assumes during walking or running, and also in order to act as a shock absorber.

The sole, in fact, must be capable of adequately decreasing the excessive load in the impact area of the foot with respect to the ground, and elastically return part of the energy received during the normal heel-toe stride, while simultaneously decreasing muscular stress and loads to the detriment of the muscular-skeletal apparatus.

Nowadays, in order to meet such needs, soles and mid-soles are used whose principal functions are, therefore, the absorption of impact during the normal heel-toe stride, elastic yield for transferring loads from the heel to the toes, and flexibility for the thrust phase.

It is therefore known to provide a mid-sole for shoes which is made of expanded polyurethane (EP) or of ethylene vinyl acetate (EVA), which constitute about 90% of the mid-sole and are characterized by a single rigidity level over the entire length of the mid-sole, from the heel to the toe.

A drawback that is found in the cited known art consists in that the mid-sole made of EVA or EP adapts slowly to the shape of the sole of the foot of the user, and therefore it is not capable of ensuring an adequate anatomical adaptation during use, making the shoe rather uncomfortable.

This drawback is felt more for users who suffer from overpronation or from excessive supination.

Pronation is a normal part of running that consists of the natural tendency of the foot to rotate inward during walking or running, in order to absorb shocks; some people have an excessive rotation (overpronation), which continues after the impact of the foot on the ground, or an insufficient rotation of the foot outward (excessive supination), both of which influence the manner of running and can increase the risk of injury and generate tendinitis both in the foot and in the knees, plantar fasciitis and other muscular inflammations.

In order to overcome these drawbacks, it is known to insert rigid supporting elements, for example in the form of vertical walls of greater or lesser thickness, in the medial wall of the mid-sole, at the plantar arch.

Such rigid elements are uncomfortable and inconvenient because they do not adapt to the shape of the sole of the foot, since they are not three-dimensionally and anatomically shaped to fit the foot.

Conventional mid-soles are often reinforced in the waist area by way of the use of added materials the function of which is to lighten and cushion the mid-sole; the use is known of pads, arranged in the heel area, which contain air or gel or similar materials, which increase impact absorption and are adapted to deform, elastically absorbing the energy of impact with the ground.

A drawback of such conventional solutions consists of a loss of impact absorption, with consequent loss of elasticity, owing to the fact that, as a consequence of repeated compressions during use, over time the mid-sole loses the shock-absorption properties and the elastic return of the thrust phase; this can be due both to the characteristics of the principal material with which it is made, and to the use of pads that can easily deflate and break if subjected to the repeated compressions that arise during sporting activity.

SUMMARY

The aim of the present disclosure is to provide a sole, particularly for shoes, that is capable of adapting rapidly to movements and to the shape of the foot of the user and which has good characteristics for cushioning and thrust.

Within this aim, the present disclosure provides a sole that ensures that the cushioning and thrust capacities are maintained over time.

The disclosure also provides a sole that ensures that an adequate level of anatomical adaptation is reached also for persons with problems of overpronation or of excessive supination.

The present disclosure further provides a sole that is structurally simple and low cost and can be made with the usual conventional plants.

These advantages which will become better apparent hereinafter are achieved by providing a sole, particularly for shoes, that has a plantar-like perimetric shape, characterized in that it is constituted by a plurality of layers that comprise at least one supporting structure, for plantar support, which is elastic and on an upper surface of which there is at least one seat for at least one mid-sole, said mid-sole being constituted by a body from the first lower surface of which a first plurality and a second plurality of elastically compressible protrusions protrude downward, each one having an axial cavity.

BRIEF DESCRIPTION OF THE DRAWINGS

Further characteristics and advantages of the disclosure will become better apparent from the detailed description of a particular, but not exclusive, embodiment of the sole according to the disclosure, which is illustrated by way of non-limiting example in the accompanying drawings wherein.

DETAILED DESCRIPTION OF THE DRAWINGS

In the embodiments illustrated below, individual characteristics shown in relation to specific examples may in reality be interchanged with other, different characteristics, existing in other embodiments.

With reference to FIGS. 1-25, the reference numeral 22 generally designates a sole, particularly for shoes, that has a plantar-like perimetric shape and is constituted by a plurality of layers.

The sole 22 comprises an elastic supporting structure 23 for plantar support, on the lower surface 24 of which a tread 25 is stably associated.

The supporting structure 23 is provided as a single piece of plastic material, using a material that has elastic characteristics, in order to facilitate its return to the original shape during the use of the shoe, and which has a density preferably comprised between (0, 11-0, 30) g/cm$^3$ and a hardness preferably comprised between (45-60) Asker C, such as for example ethyl vinyl acetate (EVA), polyethylene, EVA and polyethylene, expanded polystyrene, expanded polyurethane, expanded thermoplastic polyurethane.

The supporting structure 23 is substantially characterized by a consistency and by a hardness that are standard for the sector, so as to ensure an adequate plantar anatomical support of the sole.

On the upper surface 26 of the supporting structure 23 there is at least one seat 27 for at least one mid-sole 10.

In the embodiment shown from Figures from 2 to 5, a sole 22 with neutral anatomical characteristics is shown.

Figure 14:
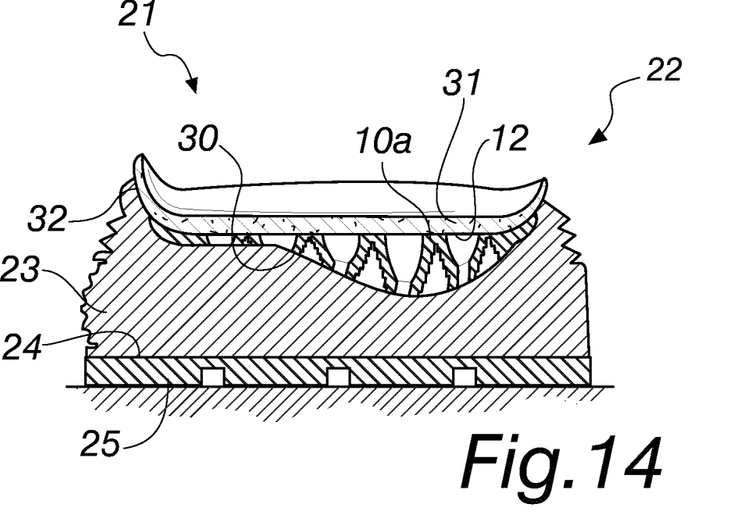
FIG. 14 is a cross-sectional view taken along the line XIV-XIV of FIG. 1, similar to that of FIG. 5, taken on a sole with anti-pronation characteristics.

In the embodiment shown in FIG. 14 a sole 22 with anti-pronation characteristics is shown.

Figure 16:
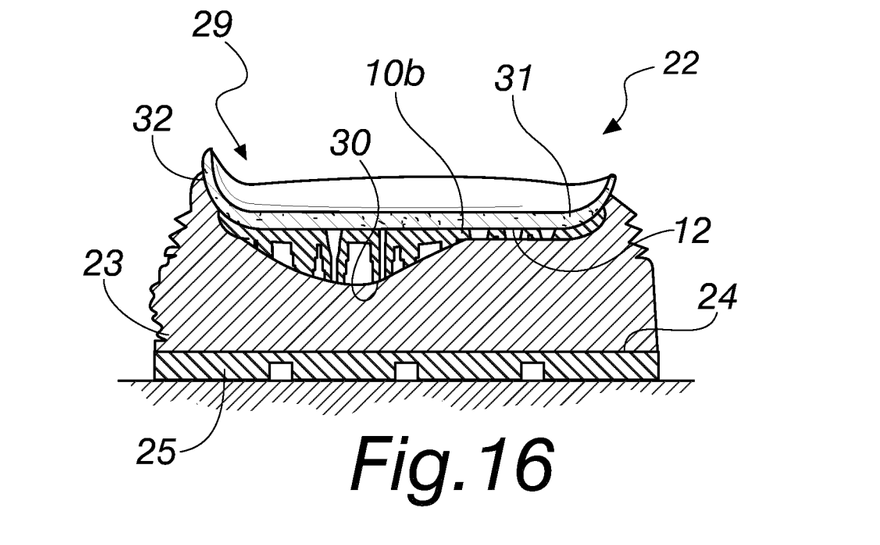
FIG. 16 is a cross-sectional view taken along the line XIV-XIV of FIG. 1, similar to that of FIG. 5, taken on a sole with anti-supination characteristics.

In the embodiment shown in FIG. 16 a sole 22 with anti-supination characteristics is shown.

Figure 18:
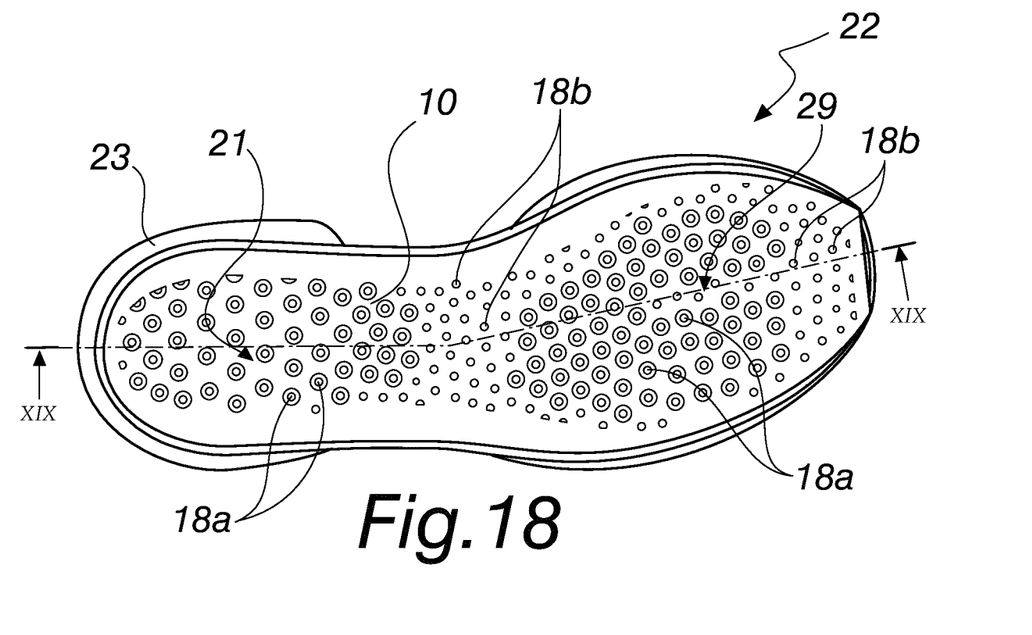
FIG. 18 is a view from above of a sole in another variation thereof.
Figure 19:
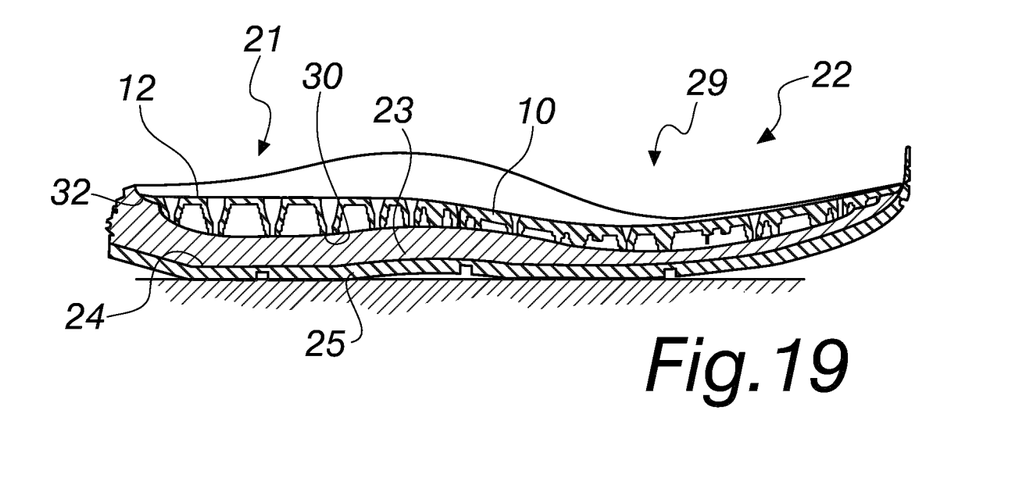
FIG. 19 is a cross-sectional view taken along the line XIX-XIX of FIG. 18.
Figure 20:
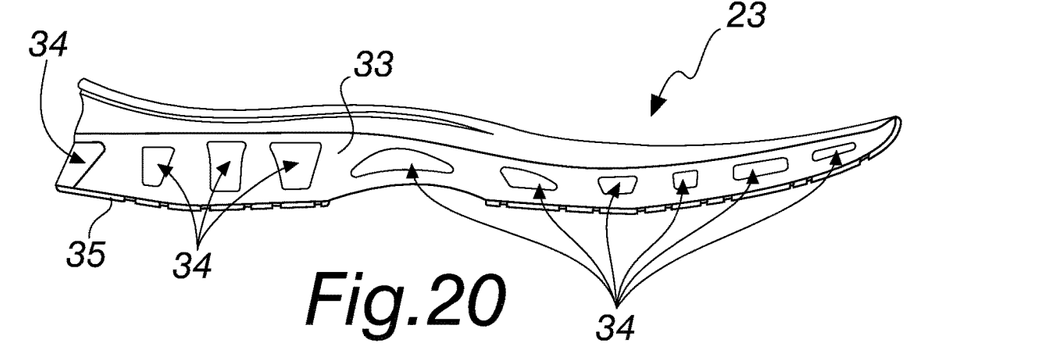
FIG. 20 is a side view of the supporting structure comprised in the sole according to the disclosure in a first variation.
Figure 21:
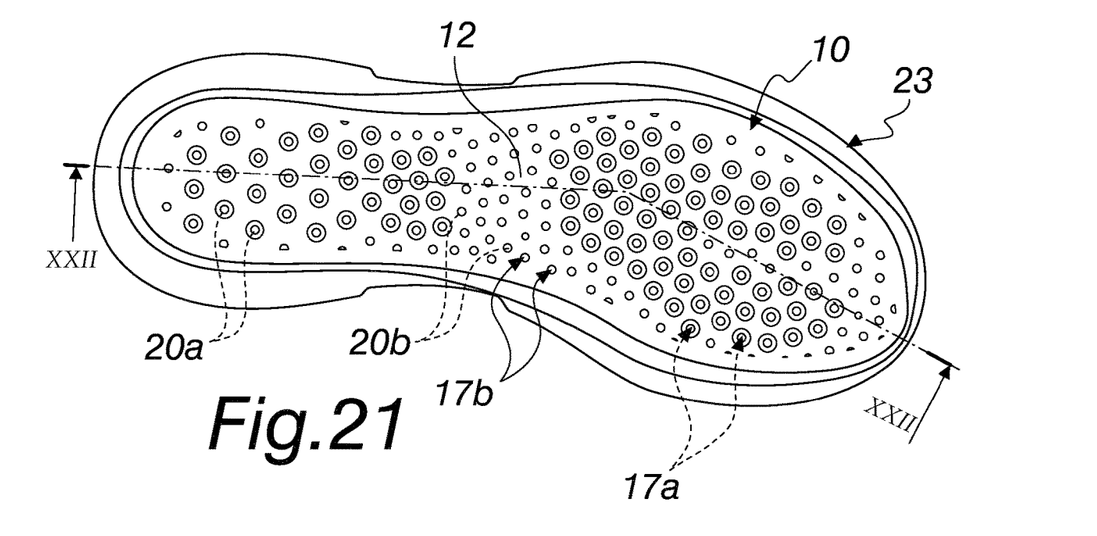
FIG. 21 is a view from above of the supporting structure of the previous Figure, associated with the mid-sole.
Figure 22:
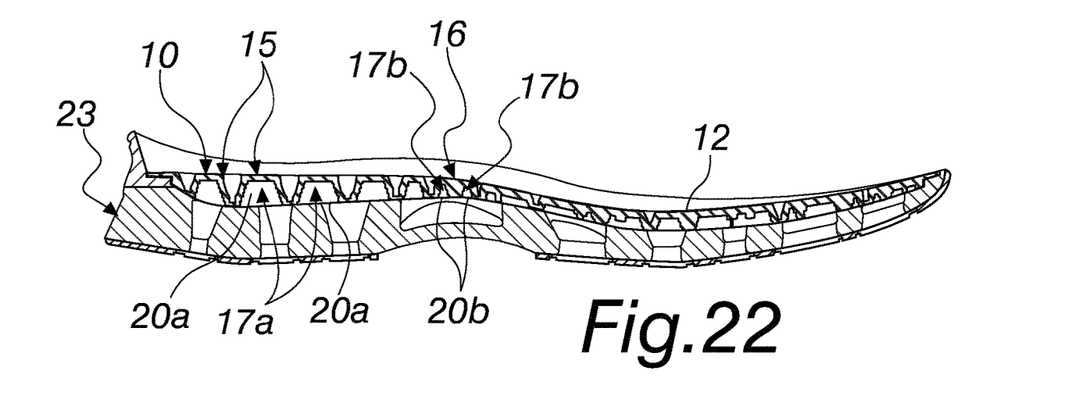
FIG. 22 is a cross-sectional view taken along the line XXII-XXII of FIG. 21.
Figure 23:
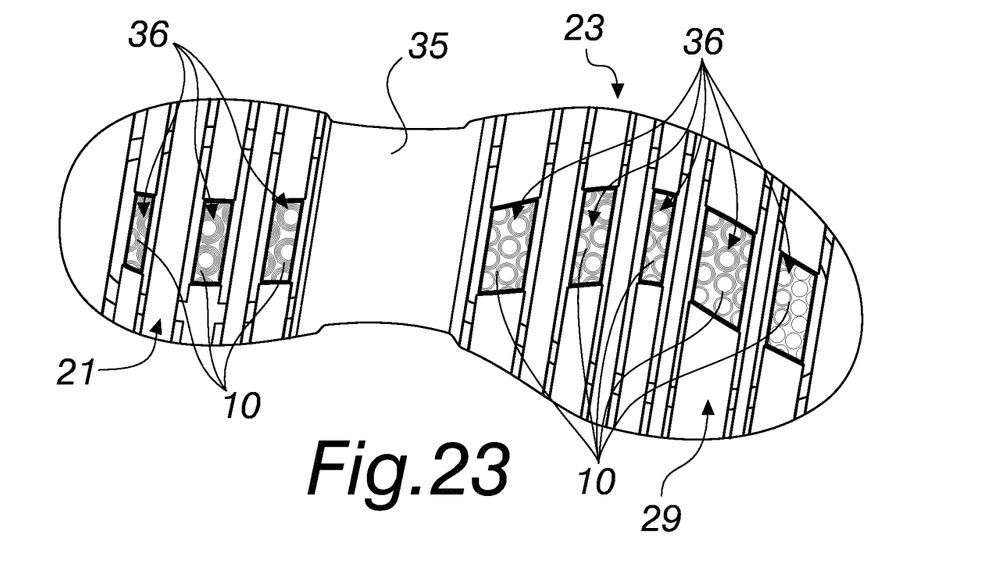
FIG. 23 is a view from below of the supporting structure associated with the mid-sole of FIG. 21.
Figure 24:
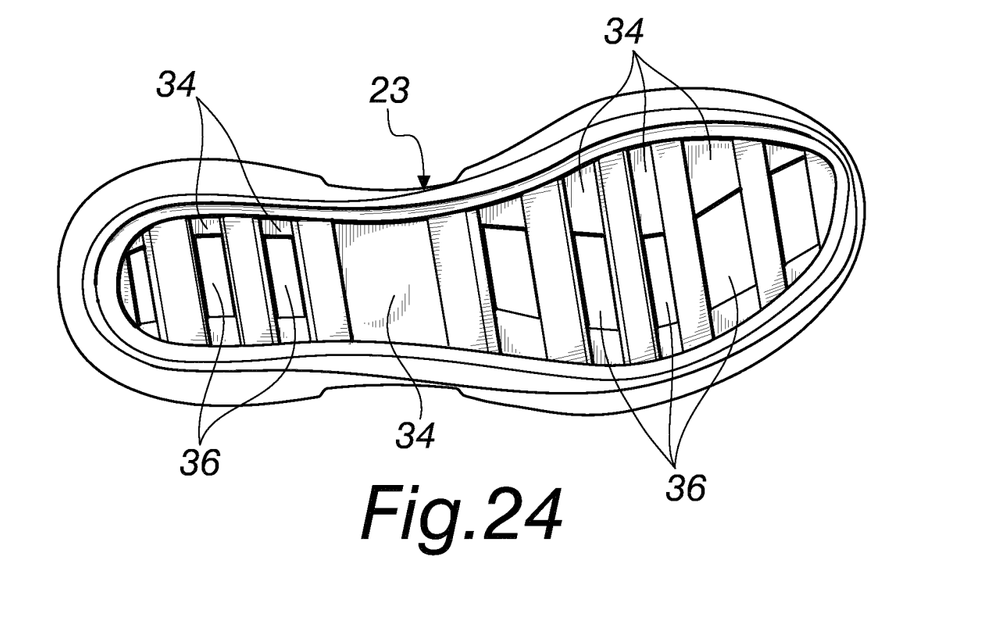
FIG. 24 is a view from above of the supporting structure associated with the mid-sole of FIG. 21.

In the embodiments shown from FIG. 2 to FIG. 5 and in FIGS. 18 and 19 there is a mid-sole 10, of substantially constant thickness, contoured to contain the sole of the foot, so as to thus define an upper surface 12 with a plantar-like perimetric shape.

Figure 13:
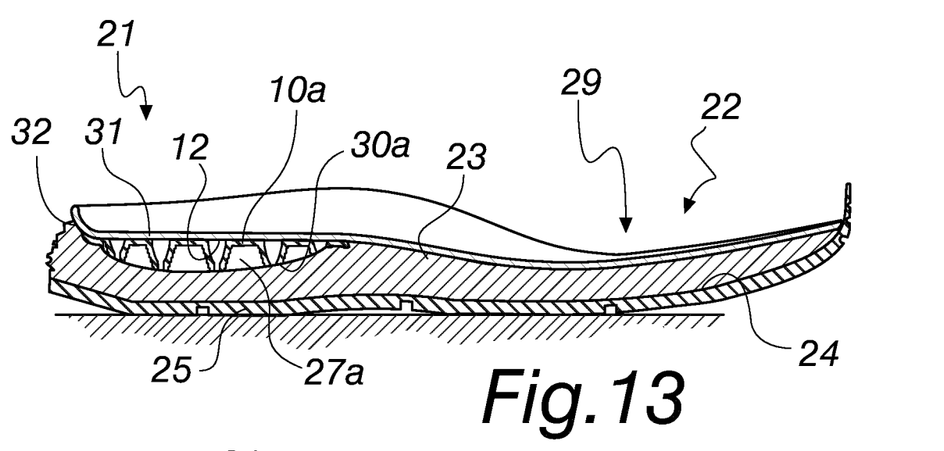
FIG. 13 is a cross-sectional view of a variation taken along the line XIII-XIII of FIG. 1, similar to that of FIG. 2.

In the embodiment shown in FIGS. 13 and 14 there is a mid-sole 10a, also of substantially constant thickness, contoured to contain the heel of the foot, in a seat 27a.

Figure 15:
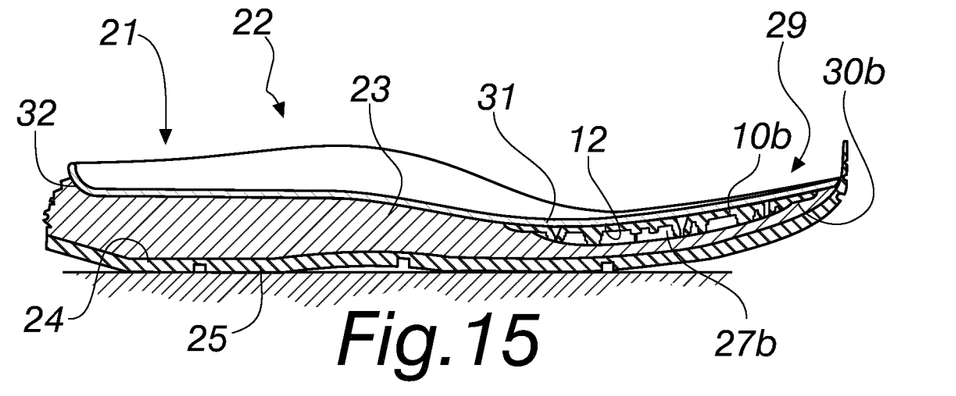
FIG. 15 is a cross-sectional view taken along the line XV-XV of FIG. 1.

In the embodiment shown in FIG. 15 there is a mid-sole 10b, also of substantially constant thickness, contoured to contain the forefoot, in a seat 27b.

Figure 17:
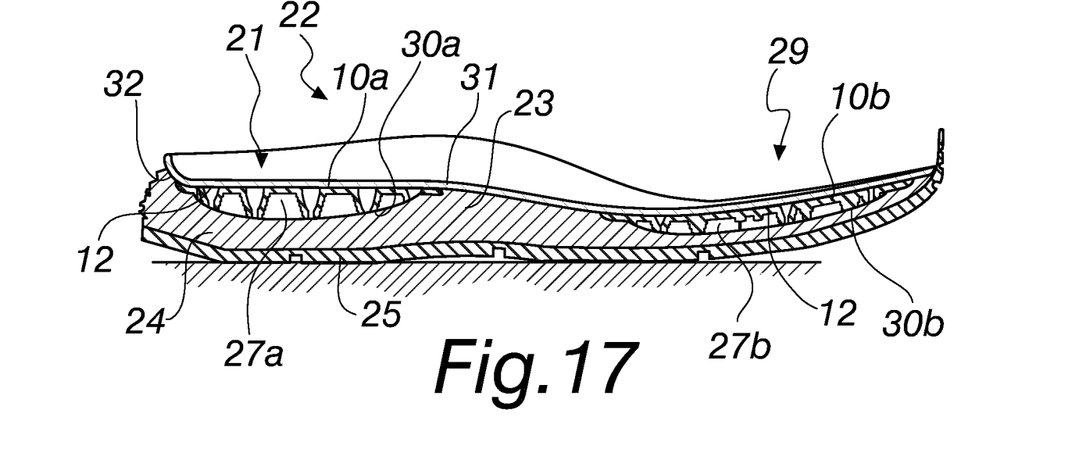
FIG. 17 is a cross-sectional view taken along the line XVII-XVII of FIG. 1, showing the sole in a variation thereof.

FIG. 17 shows a variation of the sole 22 in which there are both mid-soles 10a, 10b in respective seats 27a, 27b.

Each mid-sole 10, 10a, 10b is provided as a single piece or as multiple elements, using a material that has elastic characteristics, in order to facilitate its return to the original shape during the use of the shoe, and which has a density preferably comprised between (0, 15-1, 20) g/cm$^3$ and a hardness preferably comprised between (15-60) Shore A, such as for example SBS rubber (styrene-butadiene-styrene), N.R. rubber (natural rubber), rubber and EVA (ethylene vinyl acetate), TPU (thermoplastic polyurethane) and two-component (polyol-isocyanate) expanded PU polyurethane.

First pluralities of protrusions 15 and second pluralities of protrusions 16 protrude below from the lower surface 14 of the body 11 of the mid-sole 10, 10a, 10b; the first pluralities of protrusions 15 and the second pluralities of protrusions 16 affect the entire lower surface 14 of the body 11 and have a substantially frustum-like or pyramid-like and/or cylindrical shape.

Preferably the first pluralities of protrusions 15 have a frustum shape, while the second pluralities of protrusions 16 have a cylindrical shape.

The first and the second pluralities of protrusions 15, 16 are elastically compressible and each one has, respectively, a first axial cavity 17a and a second axial cavity 17b, both of which affect the entire height or thickness of the mid-sole 10, 10a, 10b.

First holes 18a, 18b respectively are present at the upper surface 12 of the mid-sole 10, 10a, 10b, at each one of the first pluralities of protrusions 15 and of the second pluralities of protrusions 16. As seen in FIG. 18, there is a higher quantity of first holes 18a of the first plurality of protrusions 15 at the forefoot area of the sole 22 than the quantity of first holes 18b of the second plurality of protrusions 16 at the forefoot area of the sole 22.

Each one of the first holes 18a of the first pluralities of protrusions 15 is connected to the respective first axial cavity 17a which ends, at the first apex 19a of each one of the first pluralities of protrusions 15, in second holes 20a.

Each one of the first holes 18b of the second pluralities of protrusions 16 is connected to the respective second axial cavity 17b which ends, at the second apex 19b of each one of the second pluralities of protrusions 16, in second holes 20b.

The plurality of first holes 18a, 18b and of second holes 20a, 20b has a desired diameter; advantageously the first holes 18a have a larger diameter than the diameter of the second holes 20a.

Each one of the first holes 18a, 18b has a variable diameter, preferably comprised between 1 and 10 mm as a function of the desired area of the mid-sole 10 in which the corresponding first protrusion 15 or second protrusion 16 is positioned; advantageously the first protrusions 15, which have the first hole 18a of larger diameter and a greater protrusion with respect to the lower surface 14, are arranged at the central area of the heel 21 in the central area of the forefoot 29; advantageously therefore the first and the second apices 19a, 19b of the first and second protrusions 15, 16 lie on ideal, anatomically-contoured curved surfaces.

However, each one of the second holes 20a, 20b has substantially the same diameter, preferably of approximately 2 mm.

On the lateral surface of each one of the first pluralities of protrusions 15 there is a series of concentric annular grooves that increase in diameter in the direction of the upper surface 12 of the mid-sole 10, 10a, 10b and which give the first pluralities of protrusions 15 the shape of a stepped pyramid.

This enables the first apices 19a of the first pluralities of protrusions 15 to collapse into the first axial cavity 17a thus cushioning the impact, while the presence of the concentric annular grooves of increasing diameter makes it possible to provide the elastic yield by returning the propulsive energy until the first pluralities of protrusions 15 are returned to the original shape structure, performing another cycle of impact/cushioning and elastic yield/propulsion.

The presence of the first and second axial cavities 17a, 17b contributes to lightening the mid-sole 10, 10a, 10b.

The arrangement on the desired area of the first lower surface 14 of the mid-sole 10, 10a, 10b and the size of each one of the first and second pluralities of protrusions 15, 16 and their concentration are defined as a function of the desired cushioning function, elastic yield and propulsion correlated with the anatomical shape structure of the foot of the user and of the type of activity performed by the user.

Advantageously each one of the second pluralities of protrusions 16 is constituted by a single cylindrical element.

Optionally, in the implementation solutions shown from FIG. 1 to FIG. 5 and from FIG. 13 to FIG. 17, the sole 22 comprises an ergonomic layer 31, 31a, 31b that extends substantially for the entire foot sole, is superimposed on the mid-sole 10, 10a, 10b and is coupled perimetrically to the supporting structure 23, preferably by gluing along the edges 32 that protrude from the mid-sole 10, 10a, 10b.

The ergonomic layer 31, 31a, 31b and the mid-sole 10, 10a, 10b can be preferably made by co-molding or joined by gluing.

The ergonomic layer 31, 31a, 31b is provided preferably using a material with shape memory characteristics that has a density preferably comprised between (0.05-0, 20) g/cm³ and a hardness preferably comprised between (5-55) Asker C, such as for example expanded polyurethane foam, EVA foam, polyethylene foam, polyethylene foam and EVA, and reticulated expanded polyethylene with closed cells.

It should be noted that the mid-sole 10, 10a, 10b (apart from such protrusions) and the ergonomic layer 31 are of substantially constant thickness, both lengthwise and widthwise.

Figure 1:
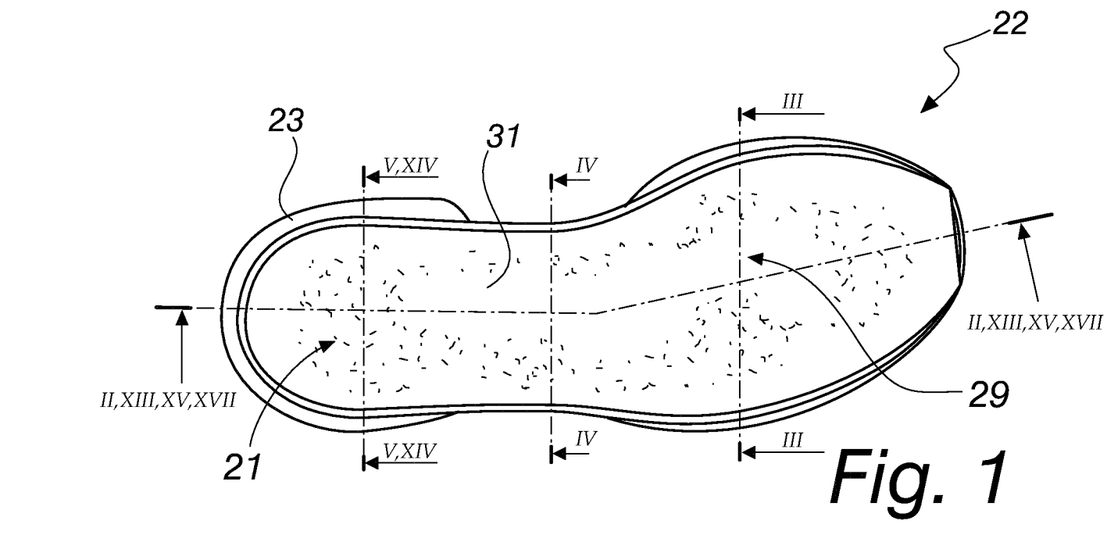
FIG. 1 is a view from above of a sole according to the disclosure.
Figure 2:
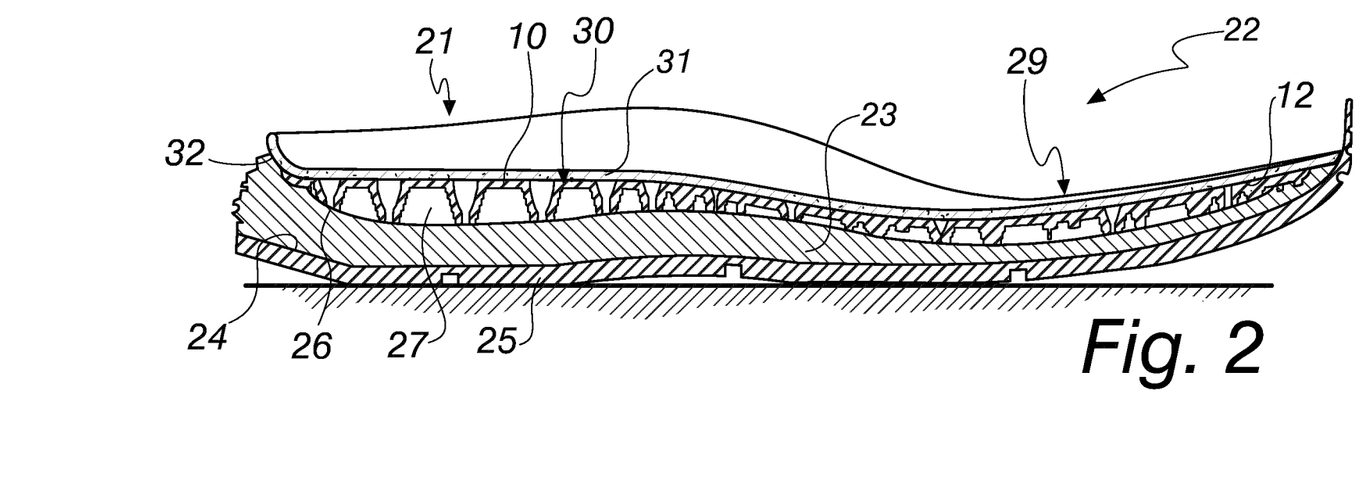
FIG. 2 is a cross-sectional view taken along the line II-II of FIG. 1, of a sole with neutral characteristics.
Figure 3:
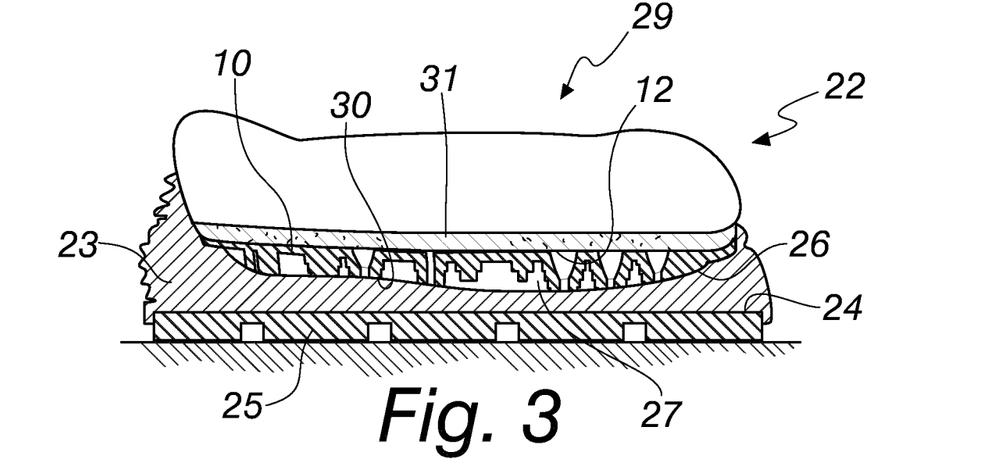
FIG. 3 is a cross-sectional view taken along the line of FIG. 1, of a sole with neutral characteristics.
Figure 4:
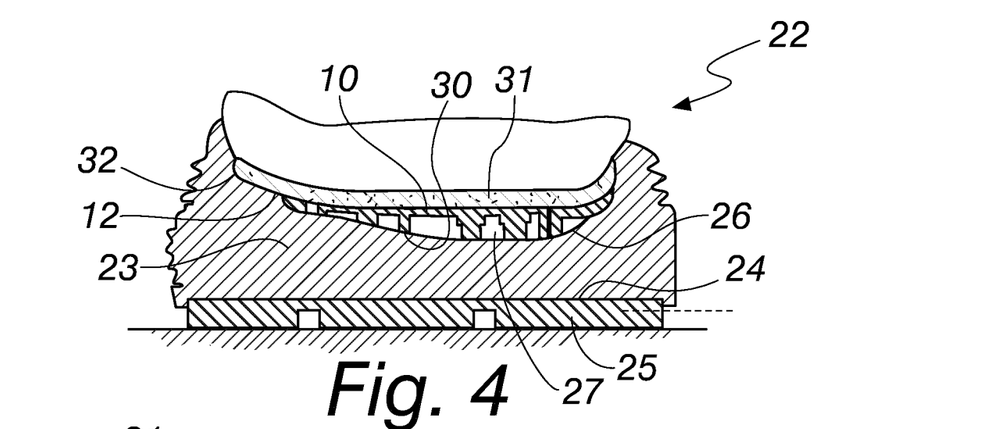
FIG. 4 is a cross-sectional view taken along the line IV-IV of FIG. 1, of a sole with neutral characteristics.

FIG. 14 is a cross-sectional view taken along the line XIV-XIV of FIG. 1 which intersects the heel area 21 of the sole 22 which is structured to have characteristics for combating pronation, which is the tendency of the foot to rotate inward while walking or running.

Advantageously the thickness of the supporting structure 23 is greater proximate to the inner area of the foot in order to increase its support.

FIG. 16 is also a cross-sectional view taken along the line XIV-XIV of FIG. 1 of the sole 22 which is structured to have characteristics for contrasting supination, which is the tendency of the third segment of the foot to rotate outward.

Advantageously the thickness of the supporting structure 23 is increased proximate to the outer area of the foot in order to increase its support.

Figure 5:
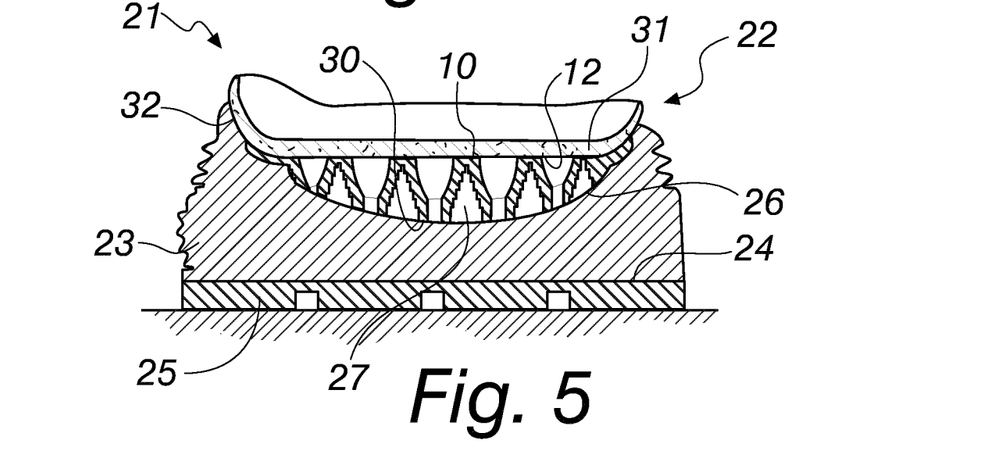
FIG. 5 is a cross-sectional view taken along the line V-V of FIG. 1, of a sole with neutral characteristics.
Figure 6:
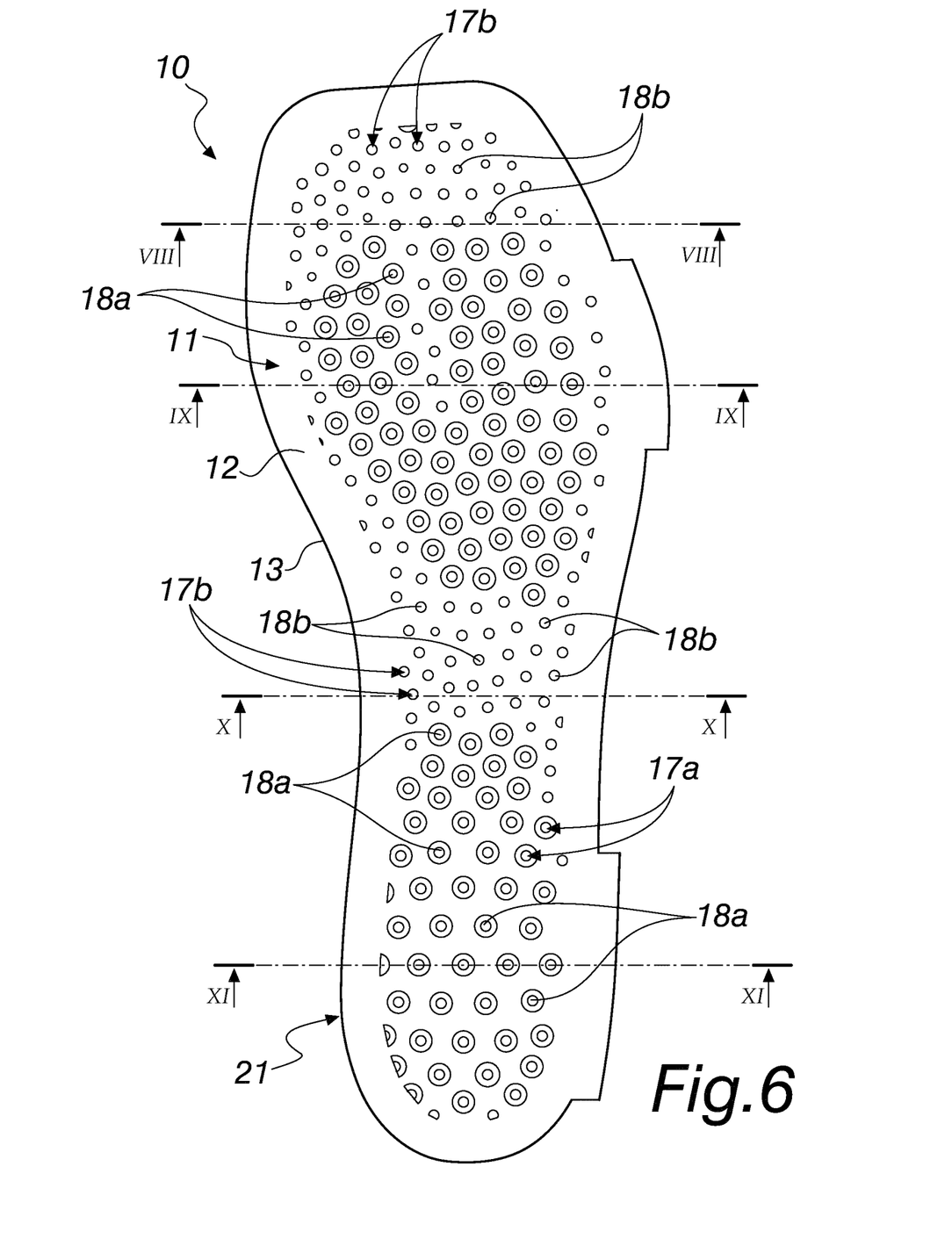
FIG. 6 is a view from above of a mid-sole comprised in the structure according to the disclosure.
Figure 7:
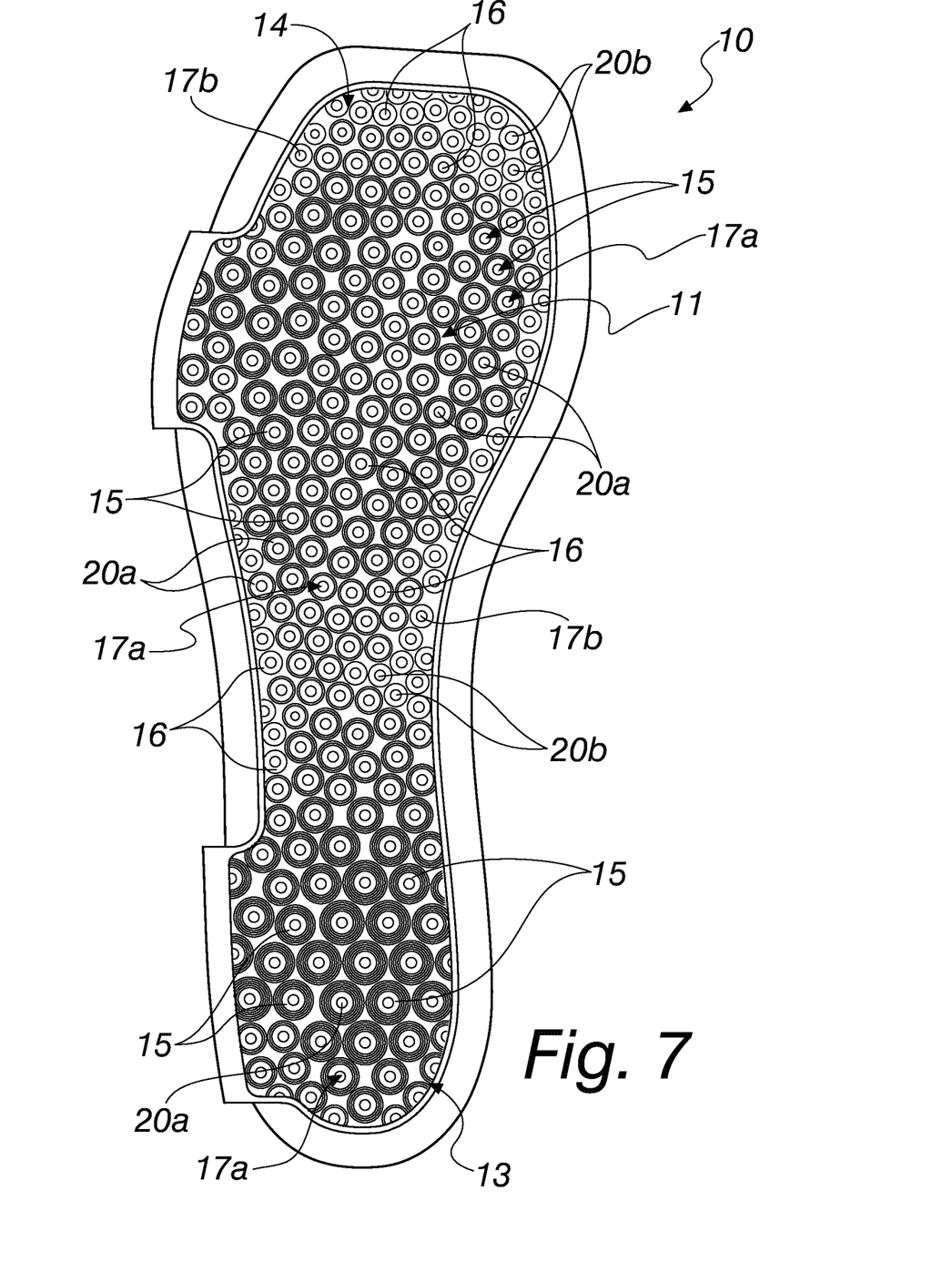
FIG. 7 is a view from below of the mid-sole of FIG. 6.
Figure 8:
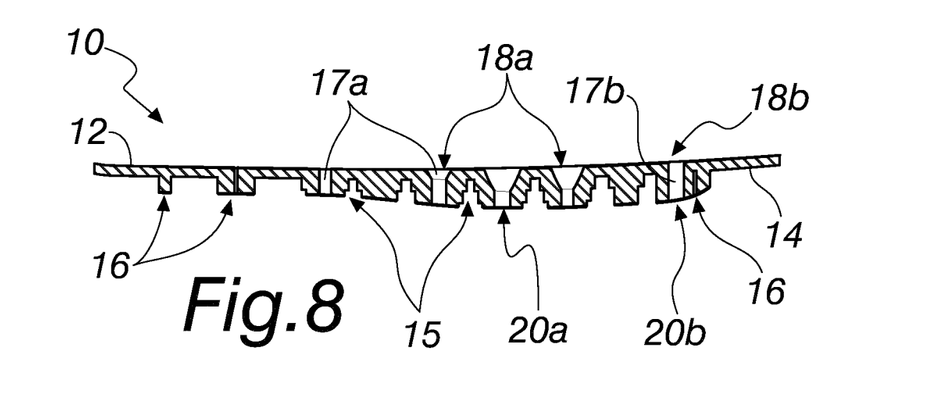
FIG. 8 is a cross-sectional view taken along the line VIII-VIII of FIG. 6.
Figure 9:
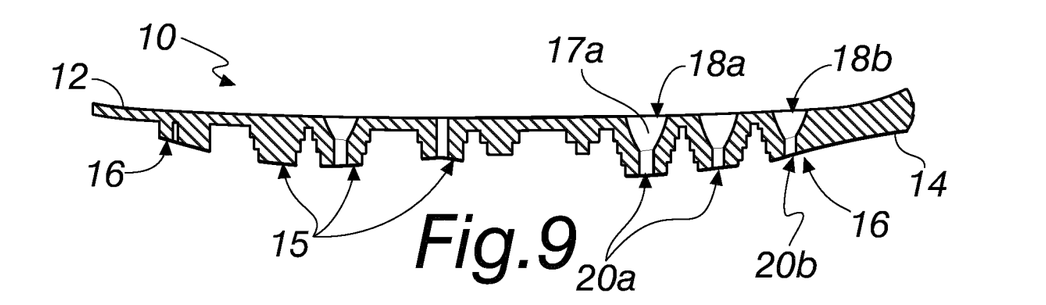
FIG. 9 is a cross-sectional view taken along the line IX-IX of FIG. 6.
Figure 10:
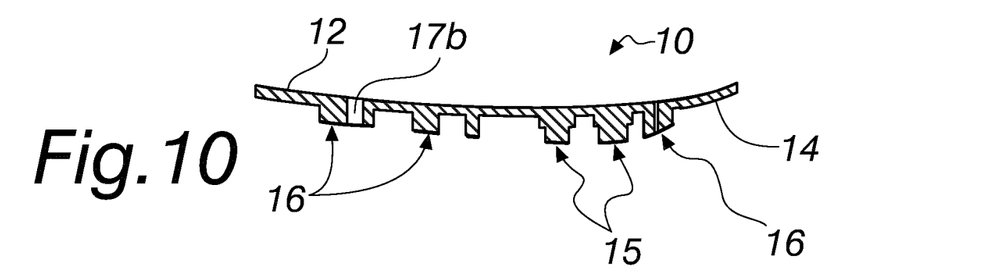
FIG. 10 is a cross-sectional view taken along the line X-X of FIG. 6.
Figure 11:
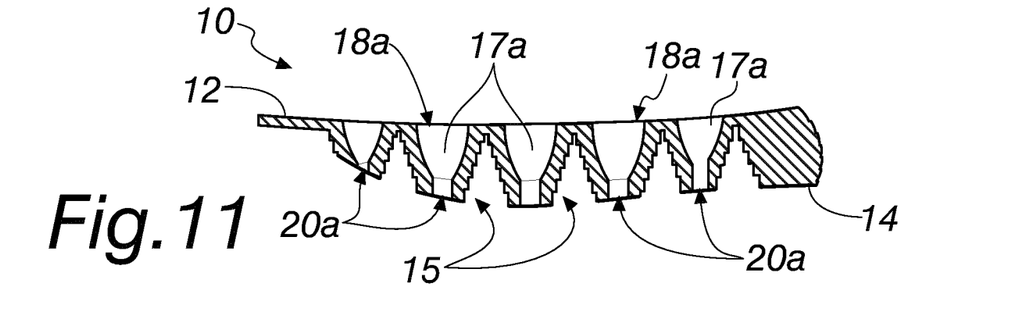
FIG. 11 is a cross-sectional view taken along the line XI-XI of FIG. 6.
Figure 12:
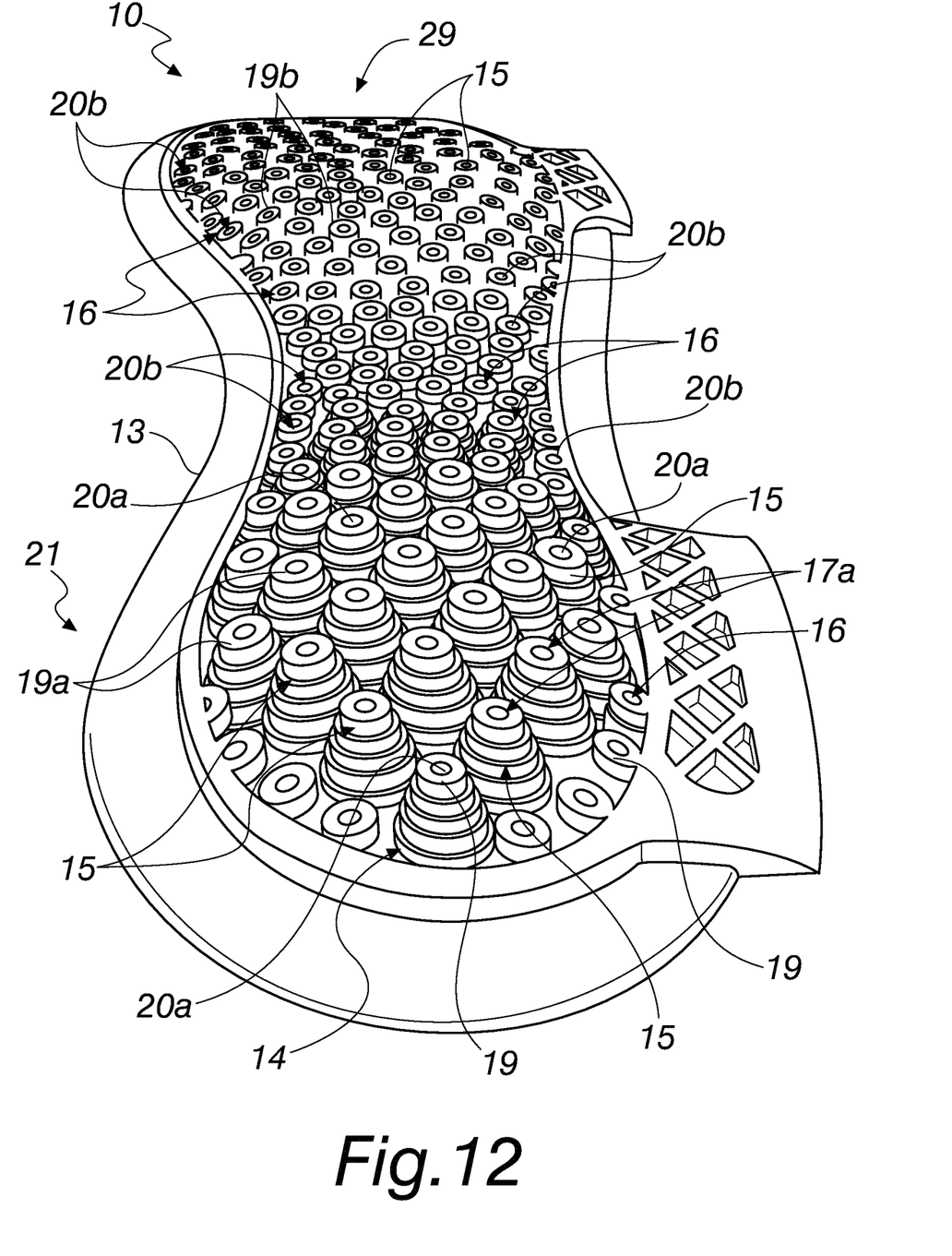
FIG. 12 is a perspective view from the heel of the lower surface of the mid-sole.

The two preceding configurations, anti-pronation and anti-supination, can be compared with FIG. 5, which is a cross-sectional view at the heel area 21 of the sole 22 with neutral characteristics.

The sole 22 therefore lends itself to being used both in the provision of sports shoes for athletes and practitioners who do not suffer from particular diseases since it offers a neutral support of the foot during the sporting activity, and in the provision of shoes for athletes with pronation or supination problems.

It is sufficient to increase the thickness of the supporting structure 23 on the internal part or on the external part in the heel area 21 and consequently adapt the mid-sole 10 to differently compensate the support of the foot of the user, thus avoiding the use of more rigid supporting inserts.

It should further be noted that the combination of the elements described that constitute the structure of the sole 22 makes it possible to improve the comfort and performance of the shoe.

Furthermore the mid-sole 10, 10a, 10b, which has high characteristics of elastic return to the original size and shape after the compression owing to the user placing his/her heel on the ground, is capable of returning the energy stored thus improving the transfer of the loads absorbed from the impact of the foot with the ground to the thrust during the normal heel-toe stride, thus ensuring over time the capacity of the sole 22 to cushion and thrust.

Finally the ergonomic layer 31, which is optional, makes resting the foot of the user more comfortable.

In the embodiment shown from FIG. 20 to FIG. 24, indicated when, for example, there is a necessity to lighten the whole, the supporting structure 23 has, ending at its lateral surfaces 33, a plurality of first openings 34 along an axis that is transverse to the lateral surfaces 33.

The shape of the first openings 34 varies as a function of specific requirements; indicatively they can have a polygonal shape, regular or irregular, or they can be curved.

The first openings 34 are arranged one beside the other, at an adapted distance between them.

Furthermore the supporting structure 23 has, at its lower surface 35, in the heel area 21 and in the forefoot area 29, a plurality of second openings 36, which are through at right angles to the lower surface 35 of the supporting structure 23.

The second openings 36 have, for the purposes of non-limiting example, a shape structure in plan view that is substantially polygonal, preferably rectangular, are arranged substantially parallel to each other, and partially affect the width of the lower surface 35.

Conveniently, when they are in corresponding areas, the first openings 34 are connected to the second openings 36, i.e. there is mutual intercommunication.

On the upper surface 26 of the supporting structure 23 there is the seat 27 for a mid-sole 10 in which the first and second pluralities of protrusions 15, 16 are open at one end and closed at the other end.

In particular each one of the second holes 20a, on the first apices 19a of the first pluralities of protrusions 15, is connected to the respective first axial cavity 17a, blind, which ends at the upper surface 12, flat and with no holes, of the body 11.

Furthermore each one of the second holes 20b, on the second apices 19b of the second pluralities of protrusions 16, is connected to the respective first axial cavity 17b, blind, which ends at the upper surface 12, flat and with no holes, of the body 11.

Obviously, the openings 34 and 36 can be arranged in any position of the sole, according to specific requirements.

Figure 25:
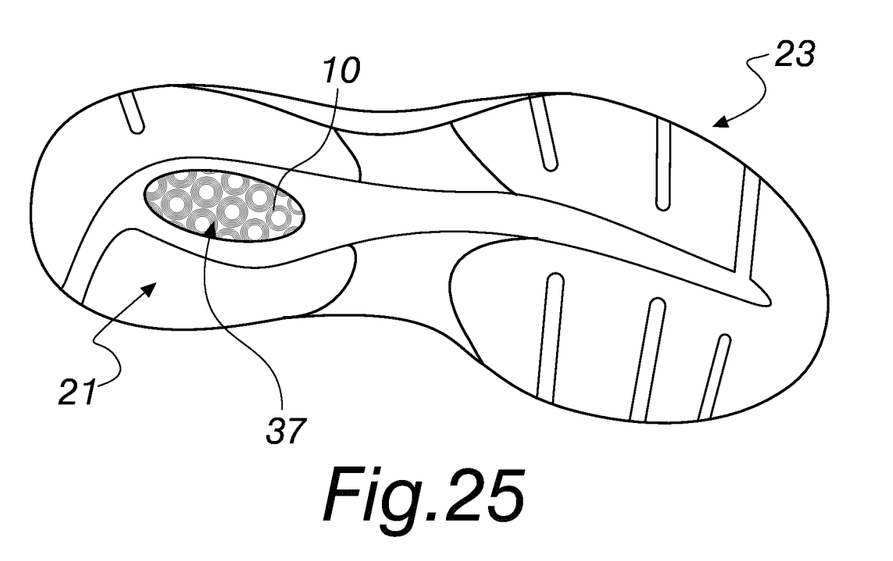
FIG. 25 is a view from below of the supporting structure comprised in the sole according to the disclosure, in a second variation, applied to a mid-sole.

In the implementation solution shown in FIG. 25, also, for example owing to needs associated with the lightness of the whole, the supporting structure 23 has, at its third lower surface 35 and at the heel area 21 only, a single third opening 37 which is through at right angles to the supporting structure 23 so as to render the mid-sole visible.

The third opening 37, for the purpose of non-limiting example, has a substantially ellipsoidal shape structure with the major axis coinciding substantially with the longitudinal axis of the supporting structure 23.

Thus it has been found that the disclosure fully achieves the intended aim and objects, a sole having being obtained that is capable of adapting rapidly to the movements and to the shape structure of the foot of the user, while at the same time having good cushioning and thrust characteristics.

It has further been found that the sole according to the disclosure ensures that the cushioning and thrust capacities are maintained over time and that an adequate level of anatomical adaptation is achieved even for users with problems of overpronation or of excessive supination.

The disclosure is susceptible of numerous modifications and variations.

The materials used as well as the dimensions of the individual components of the disclosure may be more relevant according to specific requirements.

The characteristics indicated above as advantageous, convenient or the like, may also be missing or be substituted by equivalent characteristics.

The disclosures in Italian Patent Application No. 102015000075726 (UB2015A005851) from which this application claims priority are incorporated herein by reference.

The invention claimed is:

1. A sole for shoes that is plantar-shaped, wherein the sole is constituted by a plurality of layers that comprise:
   at least one mid-sole being constituted by a body;
   a first plurality and a second plurality of elastically compressible protrusions protruding downward from a lower surface of the body;
   wherein the first and second plurality of protrusions each have an axial cavity and first holes;
   wherein an upper surface of the body has holes associated with the first holes of each protrusion;
   wherein the first plurality of protrusions are arranged at a central area of the heel of the body and at a central area of the forefoot of the body, and have a greater protruding height than the second plurality of protrusions, with respect to said lower surface of the body;
   wherein the first and second plurality of protrusions have first and second apices, respectively, forming anatomically-contoured curved surfaces;
   wherein the first and second apices are formed at free ends of said first and second plurality of protrusions, opposite to the lower surface of the body;
   wherein the axial cavity of each protrusion extends from the upper surface of the body to their respective apex;
   wherein the first holes of said first plurality of protrusions are higher in quantity than said first holes of said second plurality of protrusions, in the forefoot region of the sole;
   at least one supporting structure, for plantar support, said at least one supporting structure is elastic and includes an upper surface and a lower surface, at least one seat disposed on the upper surface wherein the first and second apices of said first and second plurality of protrusions are positioned on said at least one seat; and
   a tread associated with the lower surface of the supporting structure.

2. The sole according to claim 1, wherein the tread is stably associated with the lower surface of said supporting structure, said supporting structure being provided in a single piece of plastic material adapted to allow the return to the original shape during the use of said shoe and having a density comprised between (0.11-0.30) g/cm$^3$ and a hardness comprised between (45-60) Asker C.

3. The sole according to claim 1, wherein on said upper surface of said supporting structure there is a single seat for a single mid-sole.

4. The sole according to claim 1, wherein on said upper surface of said supporting structure there is a single seat for a single mid-sole at said heel of the body.

5. The sole according to claim 1, wherein on said upper surface of said supporting structure there is a single seat for a single mid-sole at said forefoot of the body.

6. The sole according to claim 1, wherein on said upper surface of said supporting structure there are two seats for two separate mid-soles respectively at the areas of the heel and of the forefoot of the body.

7. The sole according to claim 1, wherein said mid-sole is provided in a single piece or in multiple elements, said body having elastic characteristics adapted to facilitate its return to its original shape during the use of said shoe and having a density comprised between (0.15-1.20) g/cm$^3$ and a hardness comprised between (15-60) Shore A.

8. The sole according to claim 1, wherein said first and second pluralities of elastically compressible protrusions affect the entire lower surface of said body and have a frustum, pyramid, or cylindrical shape.

9. The sole according to claim 1, wherein said first plurality of elastically compressible protrusions have a frustum shape and said second plurality of elastically compressible protrusions have a cylindrical shape.

10. The sole according to claim 1, wherein said first holes of said first plurality of elastically compressible protrusions are connected to said first axial cavity, which ends, at said apex of each one of said first plurality of elastically compressible protrusions, in second holes, said first holes having a larger diameter than the diameter of said second holes.

11. The sole according to claim 10, wherein each one of said first holes has a diameter comprised between 1 mm and 10 mm and they are located in an area of said mid-sole in which the corresponding first plurality of elastically compressible protrusions or second plurality of elastically compressible protrusions is located, each one of said second holes having a diameter of 2 mm.

12. The sole according to claim 1, wherein on a lateral surface of each one of said first plurality of elastically compressible protrusions there is a series of concentric annular grooves that increase in diameter in a direction of said upper surface of said mid-sole and which give said first plurality of elastically compressible protrusions the shape of a stepped pyramid.

13. The sole according to claim 1, wherein said mid-sole, apart from said protrusions, has a constant thickness.

14. The sole according to claim 10, wherein said first holes of said first plurality of protrusions are connected to said first axial cavity, which ends, at the first apex of each one of said first plurality of protrusions in second holes of said first plurality of protrusions, first holes of said second plurality of elastically compressible protrusions are connected to said first axial cavity of first protrusions, which ends, at the second apex of each one of said second plurality of protrusions, in second holes of said second plurality of protrusions, each one of said second holes, which are on said first apices of said first plurality of protrusions, is connected to the respective said first axial cavity, wherein first axial cavity is a blind cavity and ends at said upper surface of said body, said second holes, which are on said second apices of said second plurality of protrusions, being connected to the respective said first axial cavity,
 wherein first axial cavity is a blind cavity and ends at said upper surface of said body.

15. The sole according to claim 1, wherein said first and second pluralities of elastically compressible protrusions of said mid-sole are open at one end and closed at the other end.

* * * * *